Aug. 14, 1951     A. L. SCHULERUD     2,563,876
MATERIAL HANDLING APPARATUS AND PROCESS
Filed Jan. 20, 1947     4 Sheets-Sheet 1
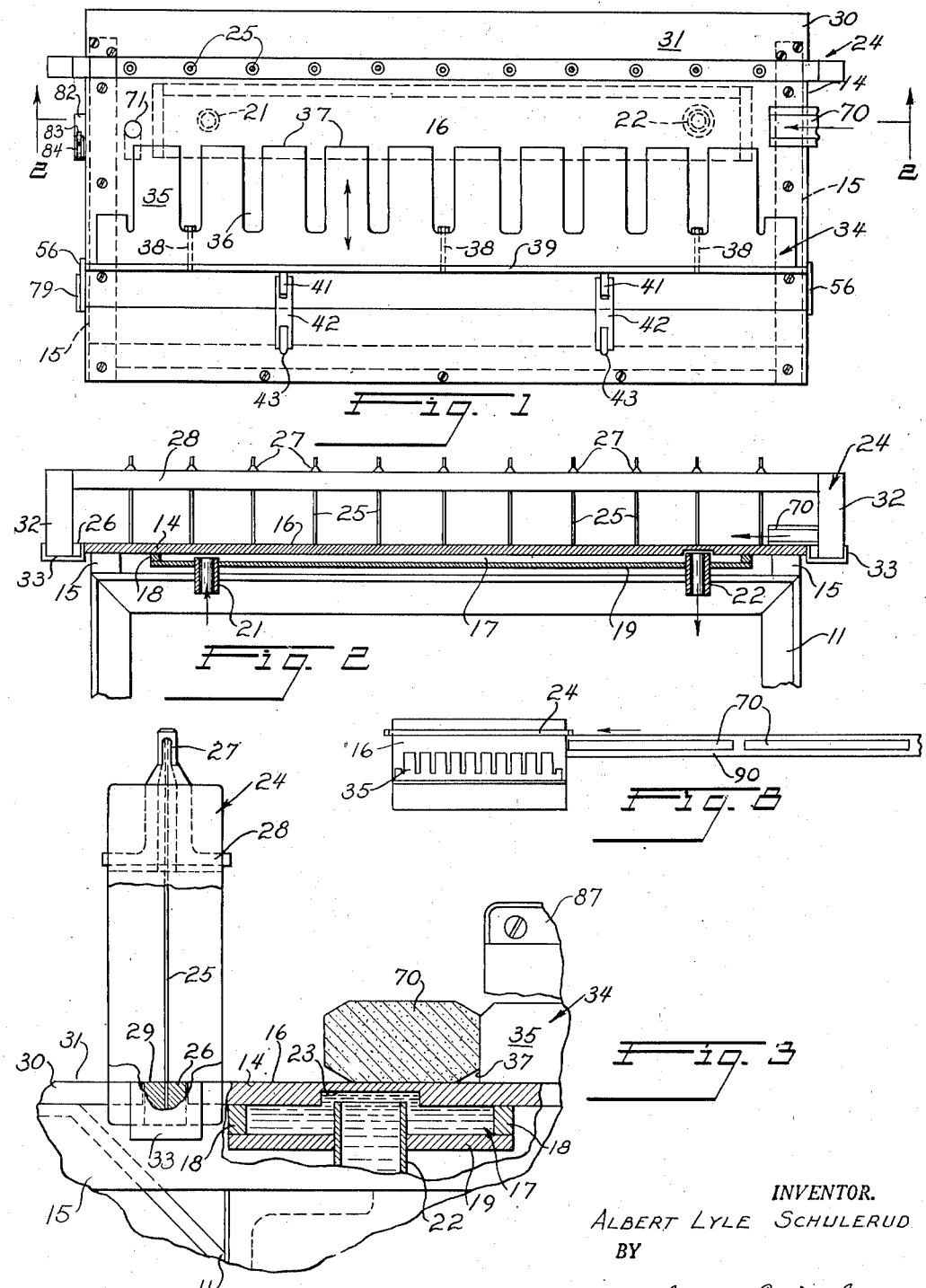
INVENTOR.
ALBERT LYLE SCHULERUD
BY
James E. Nolan
ATTORNEY

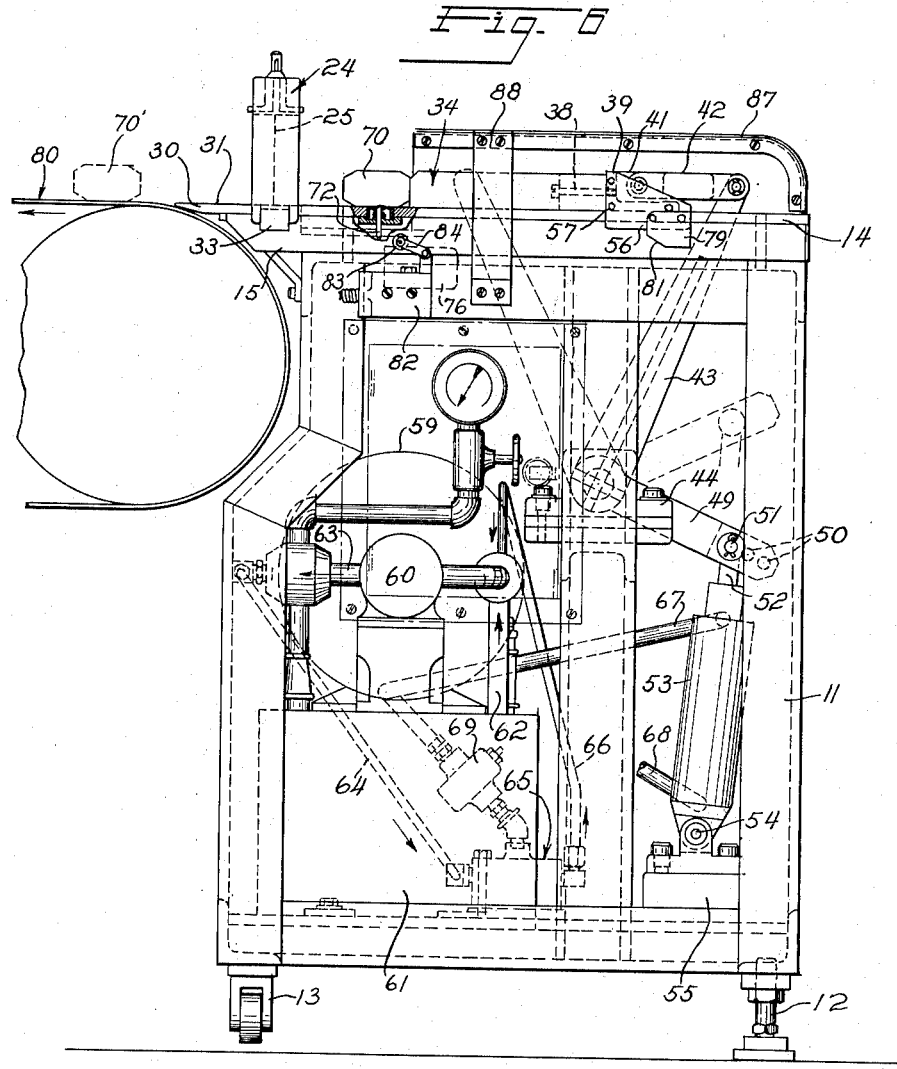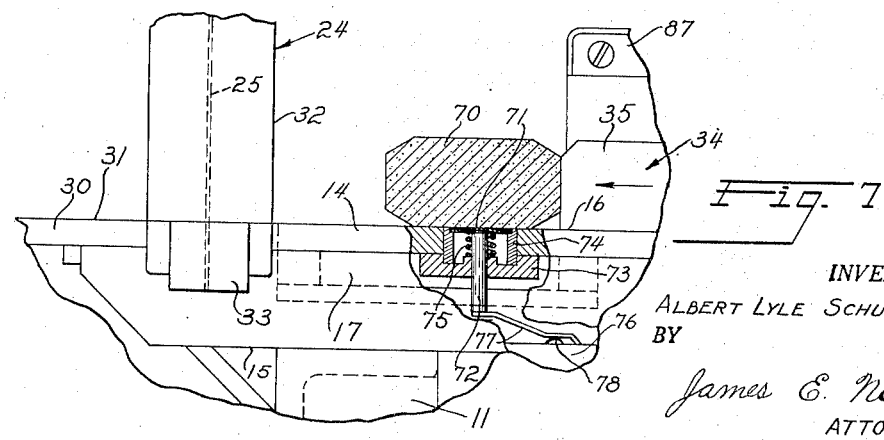

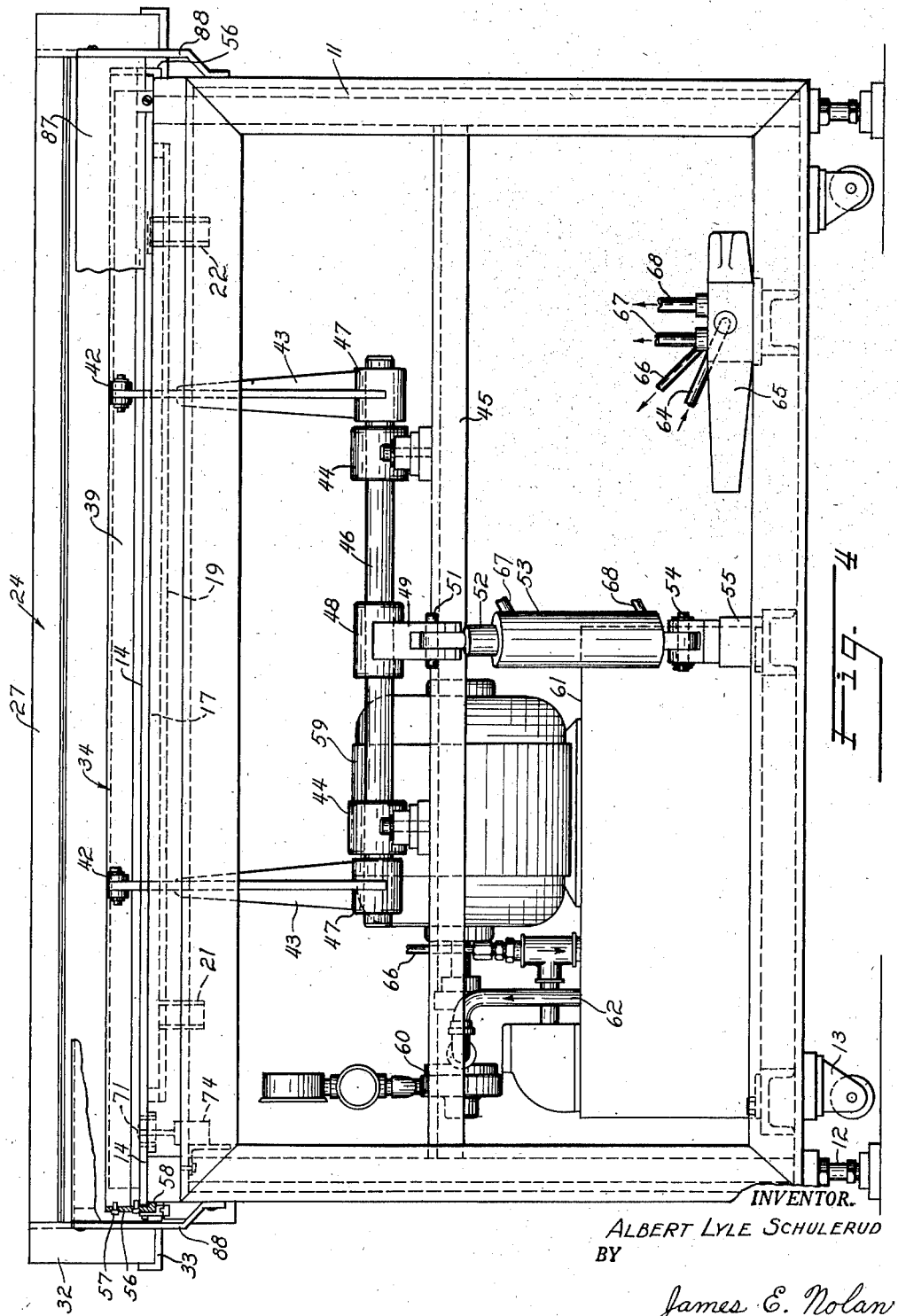

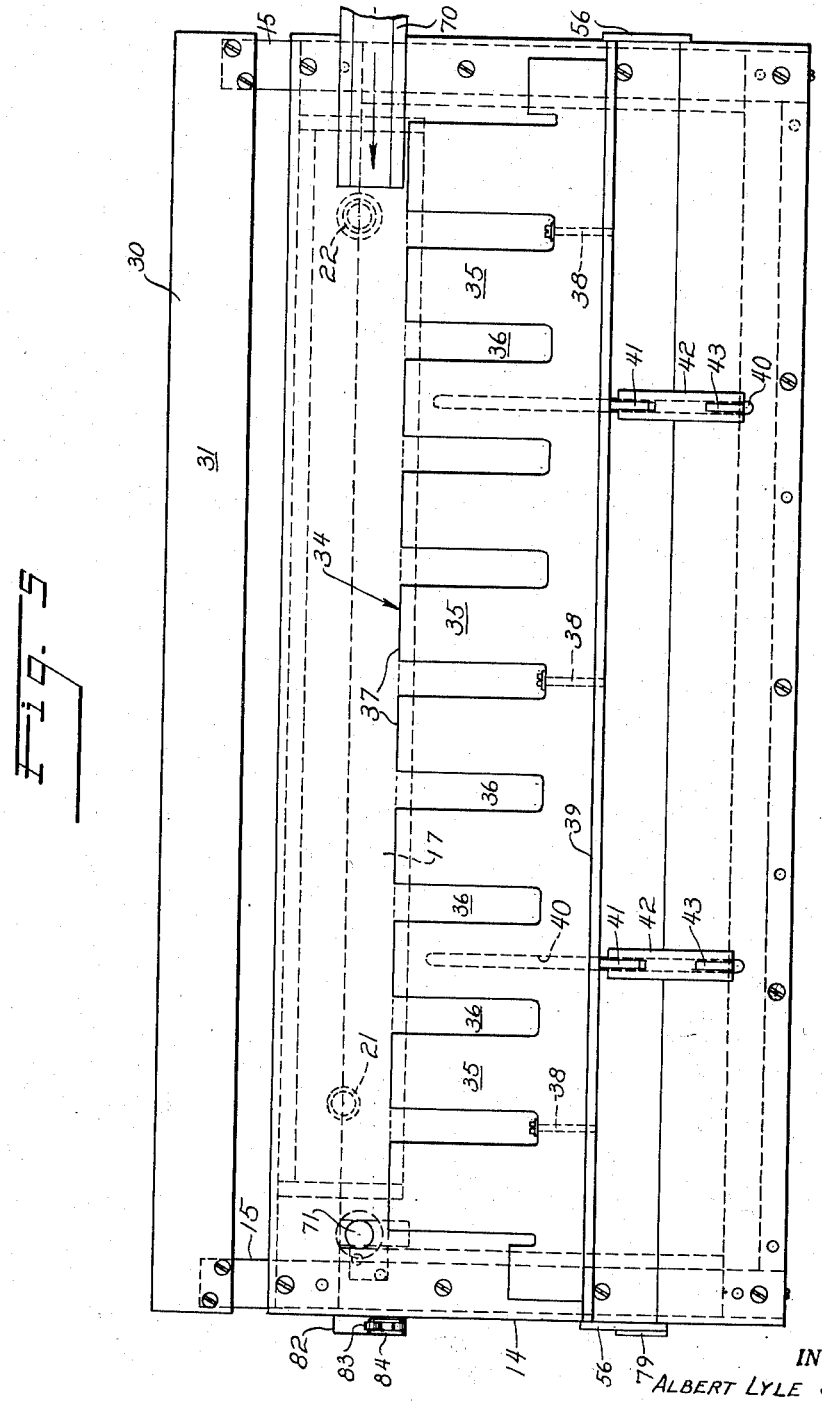

Patented Aug. 14, 1951

2,563,876

UNITED STATES PATENT OFFICE 2,563,876

MATERIAL HANDLING APPARATUS AND PROCESS

Albert L. Schulerud, Nutley, N. J., assignor to Colgate-Palmolive-Peet Company, Jersey City, N. J., a corporation of Delaware Application January 20, 1947, Serial No. 723,059

13 Claims. (Cl. 25—106)

This invention relates to apparatus and method for slidably moving bodies of soap or like plastic material along smooth surfaces, as in apparatus for subdividing a body of soap into a plurality of smaller bodies or cakes, and is particularly concerned with such apparatus and method involving improvement in the handling of soap or like material.

This invention has its preferred embodiment in the manufacture of soap, but it will be understood that its principles may be extended to the handling and/or cutting of materials of similar consistency and properties which present similar problems.

In the manufacture of soap, a solidified soap mass is usually subdivided by one or more operations into cake size, and then each cake is pressed into final form and wrapped for eventual sale. Toilet soap, which has mildness, uniform texture and other desirable properties which adapt it to use in baths and lavatories, is usually manufactured in a homogenizing and extrusion apparatus commonly called a plodder wherein the plastic soap mixture is kneaded to obtain uniformity of texture and finally extruded as a long relatively narrow bar, usually of polygonal cross-section for handling purposes although it may be of any desired cross-section. After a suitable length of the soap bar has been extruded from the plodder, a cutting operation severs that length which is fed into a cake cutting apparatus where a suitable pusher either manually or automatically moves the severed length, usually in a direction transversely of the direction of extrusion, through a suitable cutting device that usually comprises a frame having a plurality of tight vertical wires serving as individual knives. These knives, spaced the length of a cake, subdivide the severed length into cakes as it is pushed though the frame. Beyond the frame, the cake size pieces are picked up by a conveyor and delivered to a pressing machine.

In cutting apparatus of the type above described, the severed length of soap is usually delivered as a bar of rectangular or other polygonal cross-section having a flat bottom surface which is relatively smooth as determined by the temperature and surface control treatment at the outlet of the plodder, and this smooth bottom surface rests directly on a table which is preferably flat, smooth and polished so as to have minimum friction with the soap. Ordinary milled and plodded toilet soap, which has a moisture content of about 10 to 14 per cent, after extrusion from the plodder, has been found to slide very readily over a smooth, polished, metal surface such as the cutting table top at room temperature with the aid of a small amount of some lubricant like a mixture of salt water and glycerine without smearing or leaving an objectionable deposit of soap on the table. This is true of the severed length of the soap bar when it is moving in a direction away from the plodder on the supporting table surface as well as when it is being pushed transversely to that direction toward the cutting frame.

I have invented a process for making floating soap of toilet soap quality in a modification of the usual plodder apparatus, this new process and apparatus being disclosed and claimed in my co-pending application Serial No. 591,937, filed May 4, 1945, now abandoned. As disclosed in that application, the product of that process, besides having a suitable specific gravity to enable it to float in water, has a relatively high moisture content of about 15 per cent to 30 per cent. Furthermore, under usual room temperature conditions it remains warm for an appreciable period after extrusion from the plodder. When a severed length of this floating toilet soap is moved along the usual smooth, flat, cutting table surface at room temperature, it has been found to present difficulies requiring modification of the usual process and apparatus for subdividing the soap. I have found that this warm high moisture content soap sliding along the horizontal top surface of the cutting table has a tendency to smear and leave a deposit upon the surface of the table even using the usual lubricant. This deposit builds up and in time seriously obstructs proper operation of the cutting apparatus, requiring frequent cleaning. I attribute this deposit formation to the very high moisture content of the soap and to the fact that the severed length of soap is warm, usually being well above room temperature since it is freshly extruded from the plodder where it is worked at temperatures up to 130° F.

In the usual process of making non-floating toilet soap, the bottom bar surface is of low moisture content to begin with and of sufficient cohesive quality to be suitable for sliding with the aid of an appropriate lubricant. My high moisture content soap bar tends to form a suitable surface only when subjected to temperatures lower than those at which the bar is ordinarily extruded, and addition of the usual lubricant in normal amounts does not remove the difficulty attending the sliding of such a bar across a flat surface at or near the relatively high temperature of extrusion.

The present invention contemplates solution of this problem by treating the high moisture content soap after extrusion so that it does not smear or deposit on the smooth surface of the cutting table. This is done by subjecting at least the bottom surface of the severed bar length to a quick cooling action as it slides along the table surface. This quick-cooling forms a solid, wax-like surface skin upon the bottom of the severed bar length, this wax-like skin enabling the bar to slide freely upon the smooth polished table top without smearing. The usual surface lubricant is preferably used in my process.

In the preferred embodiment of the invention to be described, I accomplish this quick cooling of the lower surface of the soap bar by cooling the table top surface and this is preferably done by constructing the table as a shallow tank through which a quantity of brine liquid or some other refrigerant fluid is circulated, and having a smooth, horizontal top surface upon which the soap bar slides during the loading and cutting operations. Further aspects of the invention which will be described below as the preferred embodiment of the soap treating apparatus and method comprise a sensitive automatic arrangement for initiating operation of the cutting mechanism when a severed length of soap has assumed position for cutting along the table, and details of hydraulic pusher apparatus. It will be understood that this phase of the invention is not limited to soap cutting for the preferred embodiment.

It is therefore a major object of my invention to provide a novel apparatus and method for handling soap or other plastic material of similar properties which has such physical characteristics that it will not slide upon a smooth supporting surface at room temperature without smearing that surface.

It is a further object of my invention to provide in a soap handling apparatus a novel arrangement for cooling the bottom surface of a soap body for non-smearing sliding along a smooth supporting surface during cutting. Pursuant thereto the soap body may be precooled during delivery to said supporting surface.

It is a further object of my invention to provide a novel method and apparatus for forming a wax-like skin upon the bottom surface of a soap body adapted to be slidably moved along a smooth table top.

It is a further object of my invention to provide a novel soap handling table for cooling the bottom surface of a soap body slidable thereon.

It is a further object of my invention to provide a novel soap cutting or like table wherein the soap supporting surface is cooled.

A further object of the invention is to provide a novel soap cutting apparatus wherein positioning of the soap before a cutter frame automatically initiates operation of the cutting mechanism.

A further object of the invention is to provide a novel hydraulically operated pusher mechanism for a soap cutting apparatus.

Further objects of the invention will presently appear as the description proceeds in connection with the appended claims and the annexed drawings wherein:

Figure 1 is a top plan view of a soap cutting apparatus illustrating the relation of the pusher to the wire cutting frame;

Figure 2 is a side elevation partly in section illustrating primarily the cooling fluid circulation system for cooling the table top upon which the severed soap bar is supported and slidably moved during cutting;

Figure 3 is a fragmentary and elevational view in enlarged detail partly broken away and in section illustrating further the cooling arrangement for the table surface;

Figure 4 is a front elevation of the cutting apparatus illustrating particularly the hydraulic and related mechanism for operating the pusher;

Figure 5 is an enlarged top plan view of the cutting apparatus illustrating the pusher mechanism and control details;

Figure 6 is a side elevation of the cutting apparatus of Figures 4 and 5 end elevation, illustrating further the hydraulic mechanism and controls for the pusher;

Figure 7 is an enlarged end elevational view partly broken way and in section illustrating chiefly the soap boar actuated switch for the pusher; and Figure 8 is a diagrammatic view illustrating a manner of precooling the soap body prior to delivery to the cutting table.

In the preferred embodiment, all of the parts of my soap cutting apparatus are mounted upon a support 11 which is supplied at its bottom corners with vertically adjustable floor contacting legs 12 and a plurality of casters 13, which, as illustrated in Figure 6, are normally spaced from the floor when the apparatus is mounted on legs 12 in position for operation. When it is desired to move the machine about the factory, legs 12 are removed and support 11 may be easily moved about the floor on casters 13.

A soap bar supporting and guiding surface member which is preferably a flat metal plate 14 is rigidly mounted atop support 11 as on side ledges 15 which are rigidly secured to frame 11 and to plate 14. The flat top surface 16 of plate 14 is preferably horizontal, this being attained by adjustment of the legs 12, and surface 16 is preferably smooth and polished to minimize friction of the soap with the plate.

As illustrated best in Figures 2 and 3, the medial portion of plate 14 forms the top of a shallow tank indicated at 17, the sides and ends of the tank being formed of metal walls 18 rigidly depending from the bottom of plate 14. The bottom wall of tank 17 comprises a flat plate 19 extending parallel to plate 14 and rigidly secured to walls 18. Plate 19 is apertured at opposite sides of the apparatus to receive spaced inlet and outlet tubular nozzles 21 and 22 which are rigidly secured thereto. Nozzle 21 is connected by suitable conduit means to a suitable continuous source of liquid brine or other refrigerant (not shown) which is pumped through nozzle 21 into the interior of tank 17 and escapes therefrom through outlet nozzle 22 to be returned for further cooling in the refrigerating apparatus. The particular refrigerating apparatus and the connecting conduits may be of any conventional type and are not shown for purposes of simplicity of disclosure.

It is preferable that the top of outlet nozzle 22, as illustrated in Figure 3, is disposed above the level of the brine in tank 17, this being accomplished by cutting a corresponding recess 23 in the under surface of plate 14 and projecting the upper end of nozzle 22 within that recess. The purpose of this arrangement is to prevent air from being trapped between the top surface of the brine liquid circulating through tank 17 and the under surface of plate 14, whereby full surface contact of the refrigerant liquid in tank 17 with plate 14 is obtained and uniform efficient cooling of the surface 16 is assured.

I have found it satisfactory to circulate through tank 17 in the above described manner a refrigerant, which is mainly brine, at a temperature of about 60° F. This has proved suitable for cooling surface 16 to enable the sliding thereover of a bar of freshly plodded and severed high moisture content floating toilet soap. The temperature of surface 16 can be varied as desired to suit the characteristics of the soap or other material being moved across surface 16.

A wire frame cutting assembly 24 which extends the entire width of table surface 16 is mounted on support 11 rearwardly of plate 14. Frame 24 comprises a plurality of parallel coplanar vertical wires 25 which have their lower ends staked or anchored in a transverse rail 26 and their upper ends each secured within individual suitable fastening means 27 on top rail 28. Rails 27 and 28 are parallel and horizontal. This adjustment is for regulating the tension of wires 25. The spacing of wires 25, which are absolutely perpendicular to the horizontal plane of surface 16, corresponds to the desired length of each soap cake to be produced.

Preferably the upper surface 29 of rail 26 is in or just slightly below the plane containing surface 16. Beyond frame 24, a narrow plate 30 is rigidly secured upon support 11 on ledges 15 with a flat smooth top surface 31 disposed in the plane of surface 16. As illustrated in Figure 3, rail 26 preferably occupies the space between adjacent edges of plates 14 and 30, and surfaces 16, 29 and 31 are in the same horizontal plane whereby when a severed bar length of soap is divided into cake size by pushing it through the frame 24, the cakes emerge onto surface 31.

The above-described cutting frame is of conventional nature and need not be described further to understand the present invention, and any suitable cutting frame may be used for the purpose. It is desirable that the cutting frame be rigidly but removably mounted on support 11, and in the illustrated embodiment I have accomplished this by securing the opposite ends of rails 27 and 28 in vertical end members 32 which fit in suitable sockets 33 attached to opposite sides of support 11.

Spaced from cutting frame 24, plate 14 has slidably mounted thereon a pusher member 34 which, as illustrated in Figures 1 and 5, is formed with a series of alternate fingers 35 and recesses 36. The bottom of pusher 34 is flat and it slides on surface 16. The purpose of recesses 36 is to clear the wires 25 when the pusher advances to the forward end of its stroke, and recesses 36 are made sufficiently wide as to permit considerable variation in the lateral spacing of wires 25 without changing the pusher. The front surfaces of pusher fingers 35 all preferably lie in a common vertical plane indicated at 37 in Figure 3 and are adapted to engage the flat side surface of the soap bar to be subdivided into cake size.

Pusher 34 is reciprocated along surface 16 in a direction perpendicular to the plane of wires 25 by a suitable hydraulic mechanism described below. Forwardly of pusher 34, the latter has attached thereto, as by machine screws 38, a transverse rail or backing member 39. Backing member 39 is provided with a pair of integral upright ears 41 to which are pivotally connected the ends of a pair of links 42, and the other ends of links 42 are pivotally connected to the top ends of individual levers 43 pivoted upon a horizontal axis on support 11. Levers 43 project upwardly through slots 40 in table 14. Referring to Figure 4, spaced journals 44 are mounted upon a rigid cross-member 45 of support 11, and these journals rotatably support a shaft 46. Bosses 47 of levers 43 are rigidly secured, as by keys, upon shaft 46. Shaft 46 has centrally secured thereto a boss 48 of a lever 49, and lever 49 has its other end pivoted at pin 51 to the upper end of a piston rod 52 of a hydraulic motor element 53 that has its lower end pivotally mounted as at 54 upon a stationary bed 55 on support 11. As illustrated in Figure 6, pin 51 may be inserted in any of the series of pivot holes 50 in lever 49, thereby providing a stroke adjustment for the pusher, since in operation reciprocation of rod 52 in response to impulse of hydraulic fluid within motor 53 causes rocking of the crank comprising levers 43 and 49 and shaft 46, which rocking is transferred by link 42 into reciprocation of pusher 34.

Pusher 34 is slidably guided for reciprocation on plate 14. At each side of the pusher a bracket 56 is rigidly secured to rail 39, as by machine screws 57. As illustrated in Figure 4, each bracket 56 is provided with an inturned flange 58 which engages the under surface of plate 14, thereby forming a slide guide connection between the pusher and plate 14. Flange 58 prevents any vertical displacement of the pusher during its movement, and link 42 articulates to compensate for the vertical displacement of lever 43 as it rocks.

Referring to Figures 4 and 6, an electric motor 59 mounted on frame 11 is connected to drive a pump 60 connected to a reservoir chamber 61 by an intake conduit 62. Pump 60 circulates fluid through a normally closed system comprising conduit 62, pump 60, conduits 63 and 64, a solenoid valve 65, and a return conduit 66. Valve 65, in addition to normal return outlet 66 at one side, has two additional outlets coupled by conduits 67 and 68 to opposite sides of the piston within motor 53. As illustrated in Figure 6, conduit 67 contains a flow valve regulator 69. A similar valve is located in conduit 68 which is not completed for purposes of simplicity of disclosure.

Valve 65 is suitably controlled by solenoid operation to connect pressure intake line 64 with any one of the outlets 66, 67 or 68, and controls for actuation of the valve are provided for correlating action of motor 53 with operation of the cutting mechanism. It is not believed that further description of the hydraulic mechanism for actuating piston rod 52 is necessary beyond the above and the operation described hereinafter as all of the parts are of standard construction and can be readily purchased. If desired any suitable hydraulic mechanism for controllably reciprocating piston rod 52 may be used, such as that disclosed in Van Buren Patent No. 2,216,525 to which reference is made for detail. Mechanical means other than hydraulic may also be employed to reciprocate piston rod 52.

In operation, with reference now to Figures 1, 6 and 7, in Figure 1 a severed bar length of soap 70 is illustrated as being fed lengthwise into the cutting apparatus in the usual manner. Bar 70 is of soap freshly emergent from the plodder and cut to desired length. Bar 70 slides along the table surface 16 from right to left in Figure 1 and during this period the pusher 34 is stationary, the solenoid valve 65 being in a position where inlet 64 is connected to outlet 66 and the fluid under pressure merely circulates through a closed circuit without operating the pusher. When bar 70 has been advanced until it is so located on the table that it is entirely resting on surface 16 between frame 24 and pusher 34 and in position to be cut into cake size, the forward bottom surface of bar 70 encounters and depresses a switch control button 71 which, as illustrated in Figure 7, projects a short distance above the surface 16 so as to be operated in this manner.

Switch button 71 contacts the top of a pin 72 which is slidably mounted in a guide plate 73 rigidly secured to the undersurface of plate 14. Guide plate 73 supports a hollow cylindrical thimble 74 which extends upwardly through a suitable aperture in plate 14 and terminates flush with surface 16. The upper end of thimble 74 is shouldered to receive the periphery of button 71 which is preferably a disc of easily flexible metal so that when the leading end of soap bar 70 encounters switch button 71, the central portion of button 71 will flex downwardly against the action of a spring 75 that tends to normally maintain it in its upper position. Such flexure of button 71 depresses pin 72 which is connected at its lower end to a microswitch device 76 mounted on support 11 by means of a leaf spring 77 anchored at one end. Microswitch 76 has a switch button 78 normally in contact with spring 77 so that upon depression of rod 72 by action of the soap bar, button 78 is moved to close the circuit through switch 76.

Switch 76 is connected by suitable electric wires to a suitable solenoid within switch assembly 65 and when switch 76 is closed the solenoid moves the valve to disconnect outlet 66 from inlet 64 and to connect the latter with outlet 68, whereby fluid pressure is applied to the lower end of motor 53 to thereby cause piston rod 52 to move upward vertically and cause advance of the pusher to move soap bar 70 toward cutter frame 24.

Thus, when switch 76 is closed in response to proper location of the soap bar, pusher 34 is automatically energized to make its advance stroke to move the soap bar 70 through the cutting frame 24. This subdivides the soap into cakes and moves the cakes along surface 31 into the position indicated at 70' in Figure 6 where they are placed on a suitable conveyor belt 80 that carries them away for pressing and wrapping.

Means is provided for quickly automatically returning the pusher to its initial position to enable the feed of a new length of soap 70, for automatic operation of the machine. One of brackets 56 has secured thereto a cam plate 79 having an inclined cam face 81 facing in the direction the pusher is advanced. A second microswitch 82 on support 11 also connected to a suitable solenoid in valve 65, has a pivoted switch arm 84 on which is mounted a roller 83 that projects into the path of cam face 81 so as to be contacted and depressed thereby when the pusher reaches the forward limit of its stroke. When the stroke indicated at Figure 6 has been completed, that is when the pusher has advanced the soap through frame 24 and onto conveyor 80, cam face 81 causes rocking of arm 84 downwardly to close the circuit through switch 82. When switch 82 is closed, valve 65 is operated to connect inlet 64 with outlet 67 at the top end of motor 53, thereby accomplishing the return stroke of the pusher.

During the above operation, by the time bar 70 has been moved into the frame 24, switch 76 is opened and valve 65 tends to return to its normal position where inlet 64 is connected to return 66, but this operation is timed to permit the complete advance stroke of the pusher. Likewise, after the pusher has started its return stroke, switch 82 is opened to permit valve 65 to return to its normal position and the operation is timed to permit the full return stroke. Valves 69 may be regulated to proportion the relative timing of the advance and return strokes of the pusher, by controlling the pressure buildup during each operation, and preferably the return stroke is made faster than the advance stroke to clear the apparatus for a new operation as speedily as possible.

Valve 65 may be of any suitable construction designed to accomplish the above operation. Such a valve may be purchased commercially and I have found it satisfactory to employ the valve known as the Gerotor solenoid (single) valve Series 5510—¼ for this purpose.

A suitable protective hood 87 which is attached at its rear end along the rear rim of plate 14 and preferably is supported at its sides by brackets 88 upstanding from frame 11, extends over the pusher mechanism to protect it from dirt and for the safety of the operator.

I have therefore provided an automatic hydraulic pusher assembly wherein after a suitably precut length of soap has been advanced into cutting position on the table top, the pusher is automatically actuated to push the length of soap laterally through a wire cutting frame and deposit the cut cakes onto a conveyor for taking them away from the cutter, and the pusher mechanism is then automatically restored to its initial position ready for another operation.

Due to the fact that the surface 16 is continuously cooled by the circulation of a refrigerant through tank 17, I am enabled to use this cutting apparatus, preferably with the addition of the usual surface lubricant, for the cutting of the higher moisture content soaps even when they are in the warm easily deformable condition in which they come freshly cut from a plodder output. I have also found that this same apparatus can of course be used for the cutting of any soap, but its chief value over prior apparatus lies in its ability to handle warm high moisture content soaps. It is remarkably efficient where the flat table top contacting area of the soap is small compared to its total circumferential area. As previously pointed out, this chilling of the soap surface quickly produces a wax-like skin which slides without smearing over surface 16.

Although switch 76 is disclosed in the preferred embodiment as in the table surface it may be located elsewhere in the path of the soap bar end for the same purpose as desired.

While I have described in my preferred embodiment the cooling of the soap surface by cooling of the supporting table surface, the same result may be obtained in other ways. For example, I may continuously flush or spray the surface 16 with a refrigerant or a cooled lubricant such as salt water.

I may even precool or partically precool the bottom surface of the soap prior to delivery to surface 16. If desired, the bottom surface of the soap could be suitably cooled on the conveyor that carries it away from the plodder, either before or after cutting it into bar lengths 70. Figure 8 illustrates a series of bars 70 cut to length after emergence from the plodder carried along delivery belt 90 to table surface 16. Preferably belt 90 is a horizontal flexible metal endless band driven and supported by cooling rollers containing a refrigerant so that the undersurface of each bar 70 is cooled prior to and during delivery to surface 16. By suitable temperature control the belt may precool the soap until little or no additional cooling is needed from surface 16 during the cutting operation.

It will be further understood that this phase of the invention is applicable generallly to the moving of soap or the like along a smooth surface, whether to a cutter or any other device.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a process for handling freshly plodded soap the steps of depositing a preformed body of soap freshly extruded from the plodder upon a smooth supporting surface along which said body is to be slidably moved and chilling the surface area of said body in sliding contact with said smooth supporting surface to provide a relatively hard surface skin on said surface area and enable said soap body to slide readily along said supporting surface.

2. In soap handling apparatus, a smooth soap supporting surface upon which a bar of soap is adapted to be slidably moved in the direction of its length, means for pushing said soap bar along said surface transversely of its length, and a switch operator projecting above said surface adapted to be contacted and depressed by the leading end of said soap bar for controlling operation of said pushing means.

3. In a soap cutting apparatus, a soap cutter, an associated smooth soap supporting surface, means for pushing a bar of soap transversely along said surface into said cutter, said cutter and pushing means being disposed on opposite sides of said surface and said soap bar being moved into position between them by sliding lengthwise along said surface, and means at said surface sensitive to contact with the leading end of said soap bar for controlling operation of said pushing means.

4. In the soap cutting apparatus defined in claim 3, means actuated by said pushing means in its soap advancing stroke for reversing movement of said pushing means.

5. In the soap cutting apparatus defined in claim 3, said last means comprising power means for said pushing means, an electrical switch for controlling said power means, and a depressible switch actuating member disposed in a recess in said surface projecting above said surface in the path of said soap bar.

6. Soap cutting apparatus comprising a flat smooth soap supporting surface, a cutter and a soap bar pusher disposed on opposite sides of said surface, said soap bar being moved into position between the cutter and pusher by sliding lengthwise along said surface, hydraulic means for reciprocating said pusher comprising a motor and a reversing valve coupled thereto, means in the path of the leading end of said soap bar for operating said valve to energize said motor to cause said pusher to move said soap bar into said cutter, and means in the path of said pusher for operating said valve to reverse said motor to cause a return stroke of said pusher.

7. Soap advancing means in a soap cutter or like apparatus comprising a reciprocable pusher, a reversible hydraulic motor having a piston rod, a crank and an articulated link interconnecting said pusher and said piston rod, and a hydraulic power system operably connected to said motor.

8. Apparatus for handling freshly extruded soap comprising a flat surface upon and along which a body of said soap is slidably moved, a conveyor for delivering spaced bodies of soap in succession to said surface, and means for cooling said conveyor to precool and harden the bottom face of said soap prior to delivery to said surface.

9. In a process for handling freshly plodded soap wherein a body of said soap is slidably moved upon a smooth supporting surface, the step of chilling said surface so as to impart a relatively hard skin to the surface area of said body in sliding contact therewith.

10. In apparatus for handling soap, means providing a smooth support surface, means for sliding an elongated soap body in the direction of its length upon said surface, a cutter for subdividing said body mounted along one side of said surface, means for pushing said body transversely of said surface through said cutter and means for cooling said surface.

11. In the apparatus defined in claim 10, said means for longitudinally sliding the soap body comprising a plodder from which the soap body is extruded in warm plastic condition, and said means for cooling said surface being adapted to lower the temperature thereof appreciably below that of said body so as to impart a relatively hard skin to the contacting soap face.

12. In a process for cutting a column of soap freshly extruded from a plodder into relatively short bar lengths, the steps of feeding said column lengthwise along a chilled smooth surface that forms a hardened skin on the contacting surface of the soap, cutting a predetermined length from said column and pushing the severed length sidewise across the chilled surface into a cutter.

13. In combination with a plodder from which a column of warm plastic soap is extruded, a table providing a smooth flat surface in the path of said column and along which said extruded column is slidably advanced lengthwise by extrusion from the plodder, a cutter for severing said column into lengths corresponding to the table dimensions, a second cutter alongside the table, a pusher movable across the table from the other side to slide said severed column length into said second cutter, and means for refrigerating said table surface to quickly form a hardened skin on the soap area in contact with said surface to facilitate sliding therebetween.

ALBERT L. SCHULERUD.

REFERENCES CITED

The following references are of record in the file of this patent:

UNITED STATES PATENTS

| Number | Name | Date |
|---|---|---|
| 140,296 | Murray | June 24, 1873 |
| 273,176 | Smith | Feb. 27, 1883 |
| 501,620 | Jefferies | July 18, 1893 |
| 1,591,556 | Jones | July 6, 1926 |
| 1,809,078 | Smith | June 9, 1931 |
| 1,822,123 | Birdseye | Sept. 8, 1931 |
| 1,928,755 | Hall | Oct. 3, 1933 |
| 2,103,544 | McWade | Dec. 28, 1937 |
| 2,216,525 | Van Buren | Oct. 1, 1940 |

FOREIGN PATENTS

| Number | Country | Date |
|---|---|---|
| 430,082 | Great Britain | June 7, 1935 |